United States Patent
Emori

(10) Patent No.: US 8,872,935 B2
(45) Date of Patent: Oct. 28, 2014

(54) IMAGING APPARATUS AND IMAGING OPERATION PROCESSING METHOD

(75) Inventor: Tomoyuki Emori, Kanagawa (JP)

(73) Assignee: Sony Corporation, Tokyo (JP)

( * ) Notice: Subject to any disclaimer, the term of this patent is extended or adjusted under 35 U.S.C. 154(b) by 606 days.

(21) Appl. No.: 12/605,413

(22) Filed: Oct. 26, 2009

(65) Prior Publication Data

US 2010/0103280 A1    Apr. 29, 2010

(30) Foreign Application Priority Data

Oct. 27, 2008  (JP) ................ P2008-275265

(51) Int. Cl.
*H04N 9/73* (2006.01)
*H04N 5/262* (2006.01)
*H04N 5/232* (2006.01)

(52) U.S. Cl.
CPC .............. *H04N 9/73* (2013.01); *H04N 5/2628* (2013.01); *H04N 5/23296* (2013.01); *H04N 5/232* (2013.01)
USPC .................................. 348/223.1; 348/240.99

(58) Field of Classification Search
USPC ........................ 348/223.1, 251, 254, 240.2
See application file for complete search history.

(56) References Cited

U.S. PATENT DOCUMENTS

| | | | |
|---|---|---|---|
| 5,959,670 A | | 9/1999 | Tamura et al. |
| 6,618,091 B1 * | | 9/2003 | Tamura .................. 348/363 |
| 6,812,967 B1 | | 11/2004 | Niikawa et al. |
| 2004/0201767 A1 * | | 10/2004 | Niikawa et al. ........ 348/333.03 |

FOREIGN PATENT DOCUMENTS

| | | |
|---|---|---|
| JP | 2 174471 | 7/1990 |
| JP | 4 87372 | 3/1992 |
| JP | 5 292389 | 11/1993 |
| JP | 7 87372 | 3/1995 |
| JP | 9 83861 | 3/1997 |
| JP | 2000 350088 | 12/2000 |
| JP | 2001 177741 | 6/2001 |
| JP | 2004 64676 | 2/2004 |
| JP | 2007 19726 | 1/2007 |
| JP | 2007-164737 | 6/2007 |
| JP | 2007 300360 | 11/2007 |

* cited by examiner

*Primary Examiner* — Twyler Haskins
*Assistant Examiner* — Carramah J Quiett
(74) *Attorney, Agent, or Firm* — Frommer Lawrence & Haug LLP; William S. Frommer; Ellen Marcie Emas

(57) ABSTRACT

An imaging apparatus includes: an imaging portion that obtains an imaging video signal; an enlargement processing portion that extracts a partial range from a picture frame range of the imaging video signal and applies video enlargement processing; a first detection portion that obtains a detection value for an automatic processing capability of a first type using the picture frame range before enlargement as a subject; a second detection portion that obtains a detection value for an automatic processing capability of a second type using a picture frame range of the imaging video signal after enlargement by the enlargement processing portion as the subject; a control portion that controls operations of the automatic processing capabilities of the first and second types according to the detection values; and one or plural processing portions that execute the automatic processing capabilities of the first and second types under control of the control portion.

8 Claims, 7 Drawing Sheets

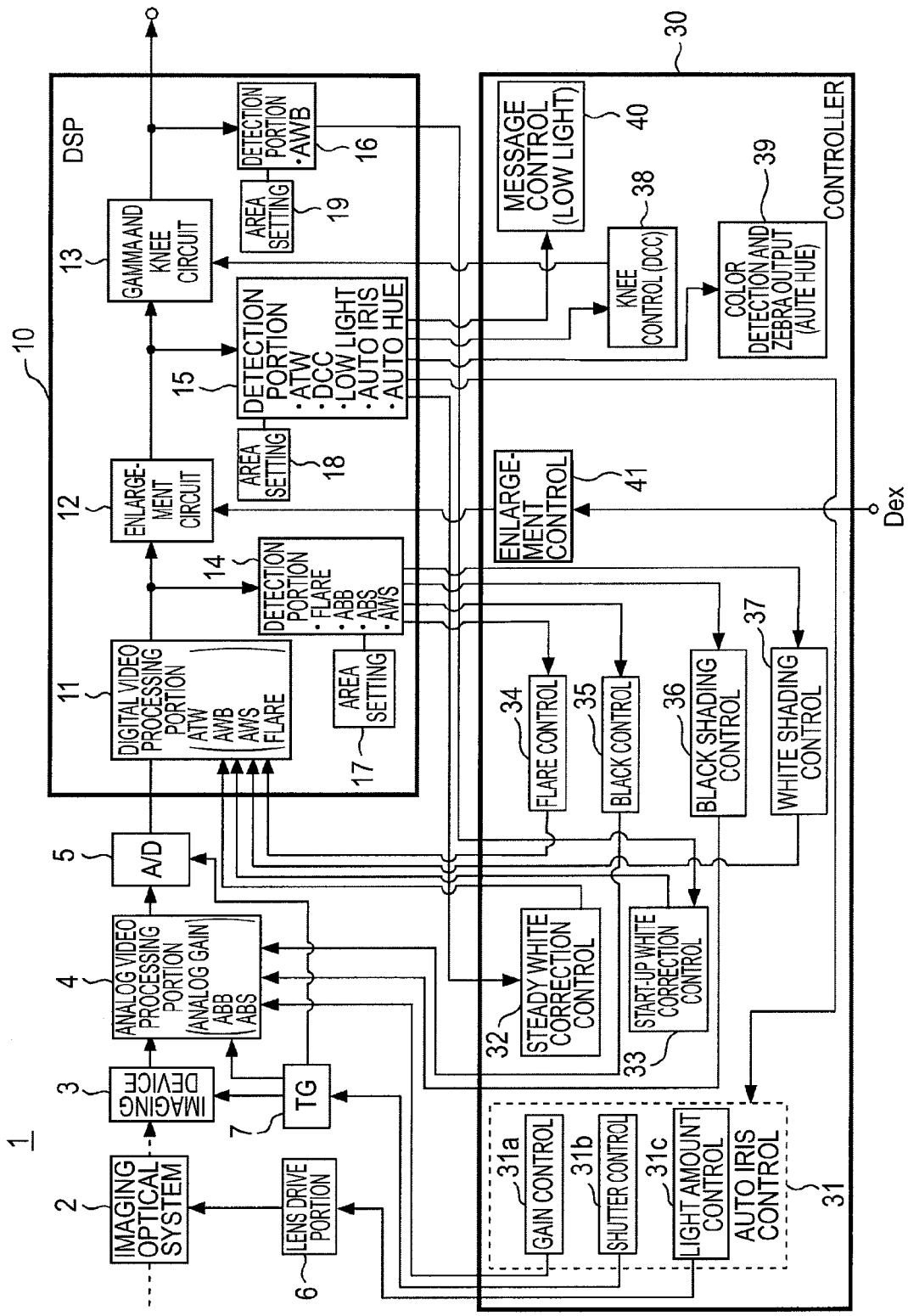

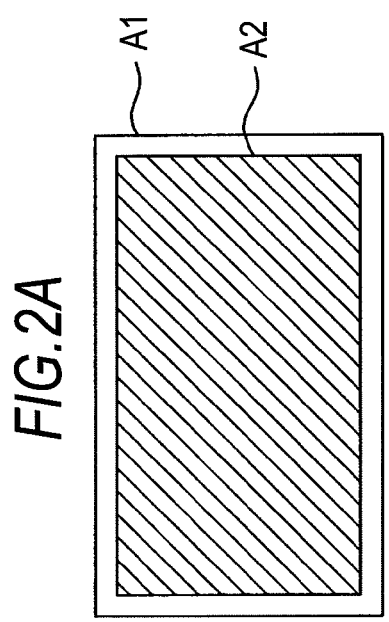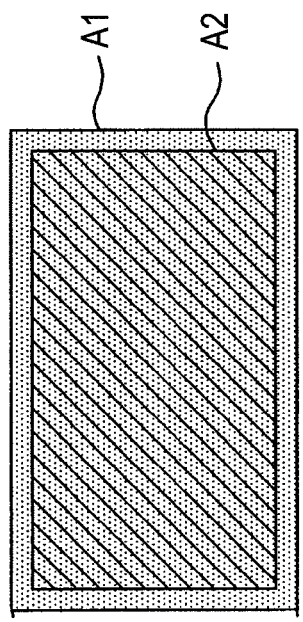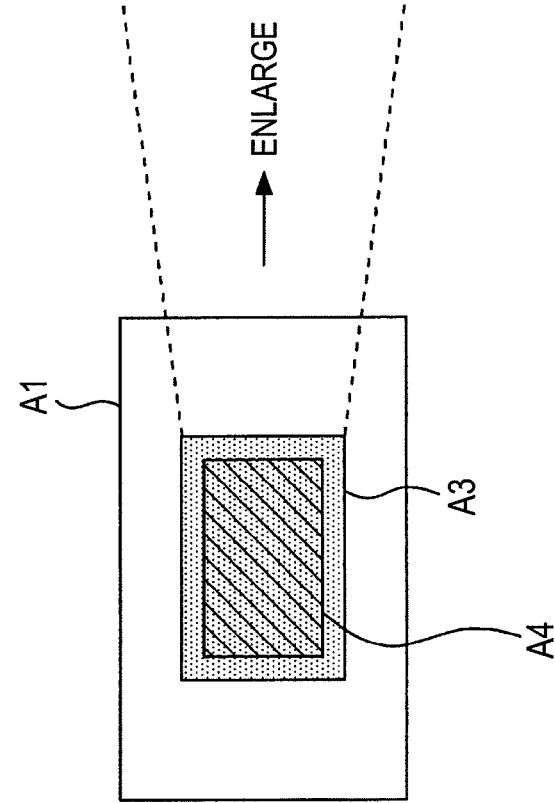

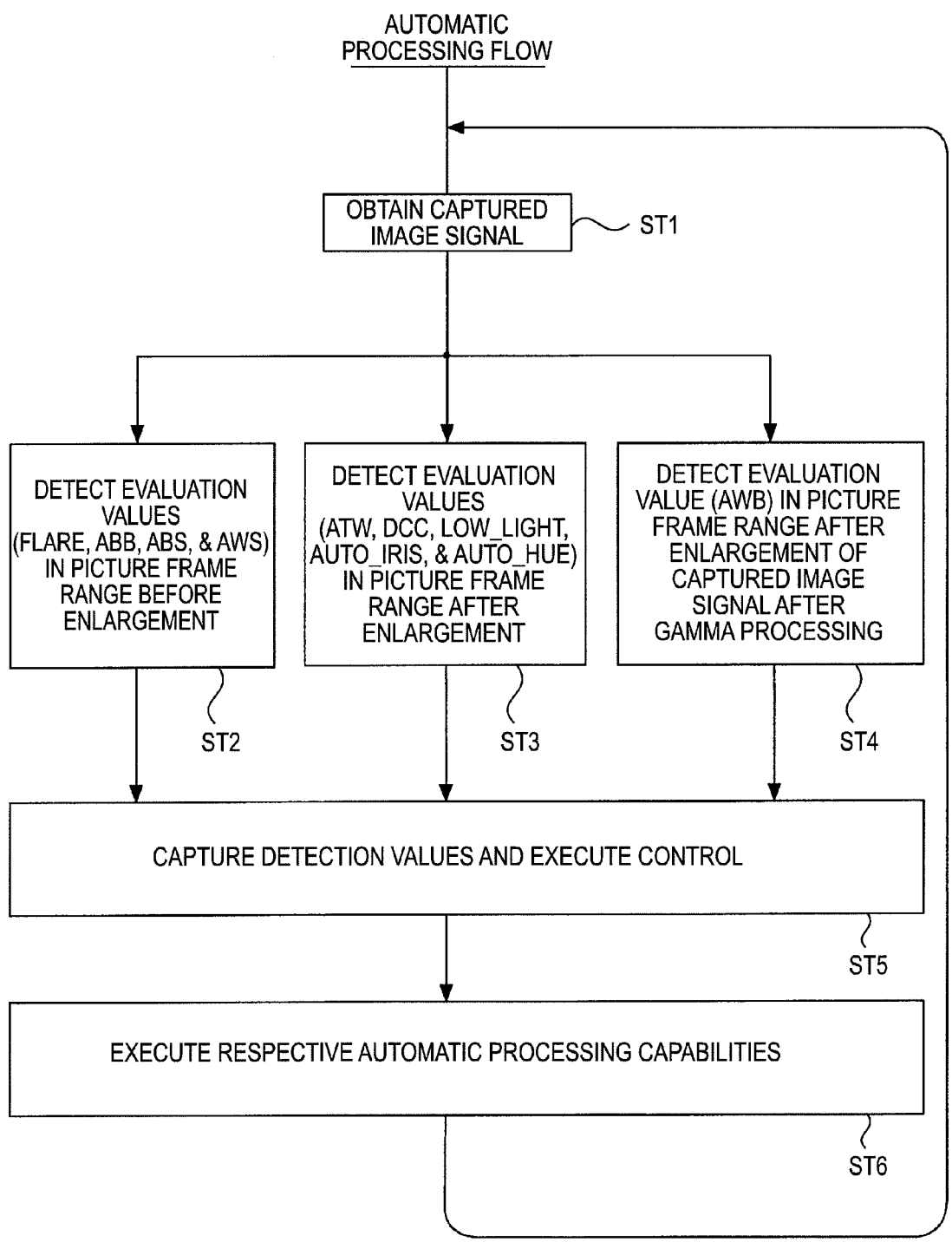

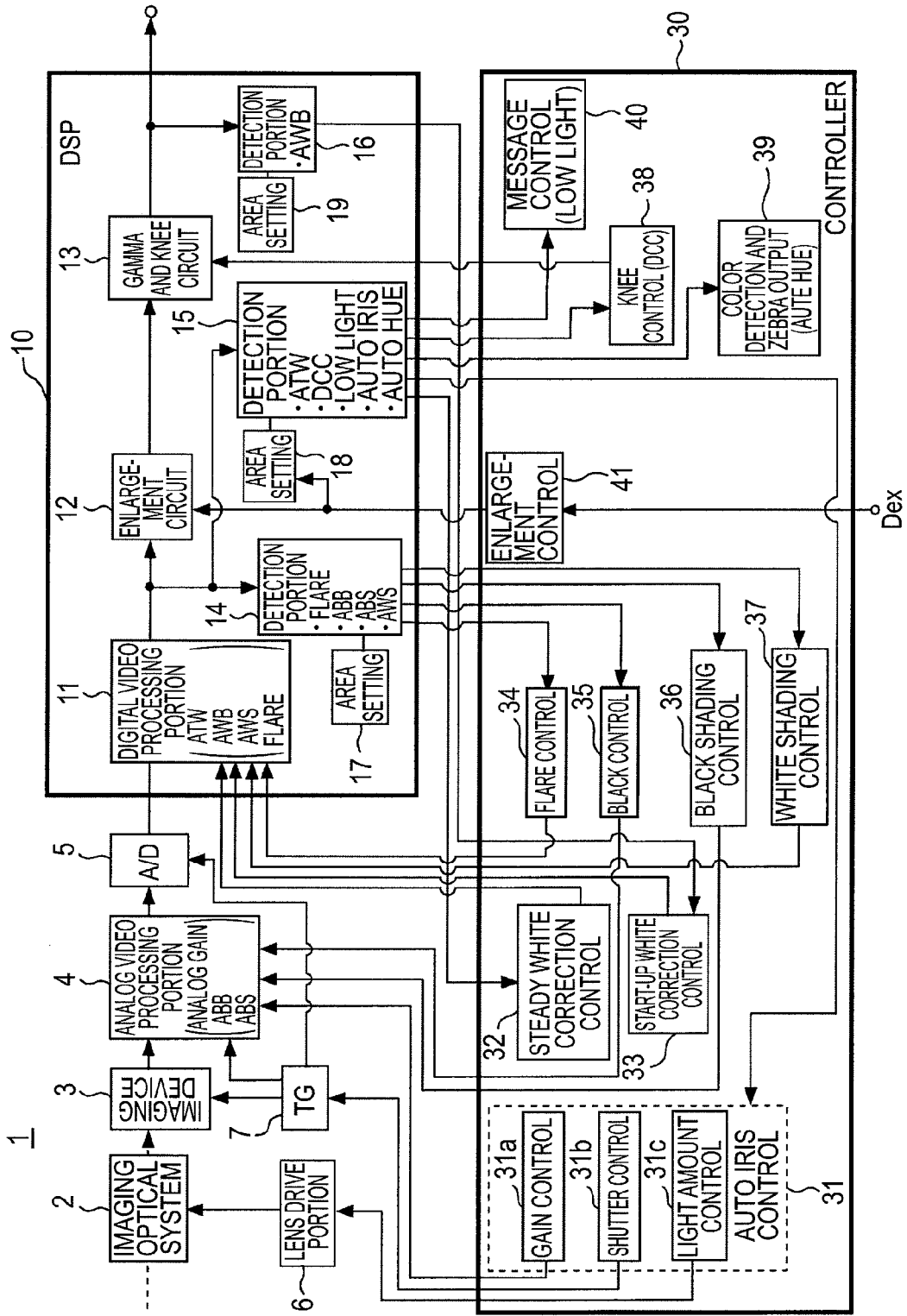

IMAGING APPARATUS AND IMAGING OPERATION PROCESSING METHOD

BACKGROUND OF THE INVENTION

1. Field of the Invention

The present invention relates to an imaging apparatus and an imaging operation processing method, and more particularly, to operations of respective automatic processing capabilities of an imaging apparatus.

2. Background Art

Generally, an imaging apparatus, such as a video camera and a digital still camera, is furnished with automatic processing capabilities, such as auto iris, auto white balance, and flare correction capabilities. At the time of imaging, evaluation values for these processing operations are detected from an imaging video signal, so that an automatic adjustment is performed to obtain an appropriate imaging video signal.

Details are described, for example, in JP-A-5-292389, JP-A-2-174471, JP-A-2001-177741, JP-A-4-23576, JP-A-7-87372, and JP-A-2000-350088.

SUMMARY OF THE INVENTION

Incidentally, the imaging apparatus recodes or displays an imaging video signal or transfers an imaging video signal to an external device, for example, after enlargement processing in some cases.

The enlargement processing referred to herein means processing to generate an enlarged video signal, for example, by extracting a part of a pixel range (picture frame range) obtained by an imaging device portion as an imaging video signal.

In a case where such an enlarged video signal is outputted for the purpose of recording, there may be a case where the respective automatic processing capabilities are not performed appropriately.

More specifically, according to the respective automatic processing capabilities, the evaluation values are detected using the picture frame range obtained by the imaging device portion, such as CCD, as the subject of detection and predetermined signal processing and operation control on a lens system are preformed by feedback control or the like according to the detected values. In a case where an enlarged video is outputted, however, the video signal to be outputted is a partial range of the picture frame range obtained by the imaging device portion.

In other words, signals of pixels outside the range of the video signal to be outputted are included as the subject of detection for the automatic processing capabilities and an exact state (for example, a luminance state and a color state) of the enlarged video signal is not necessarily reflected.

Such being the case, there are cases where an appropriate video signal is not obtained when the enlargement processing is performed because the automatic processing capabilities are not performed appropriately.

Meanwhile, depending on the type of automatic processing capabilities, it is preferable to use the picture frame range obtained by the imaging device portion as the subject of detection even when the enlargement processing is performed.

Thus, it is desirable to enable an imaging apparatus that occasionally performs enlargement processing to perform the respective automatic processing capabilities appropriately.

According to an embodiment of the present invention, there is provided an imaging apparatus including: an imaging portion that obtains an imaging video signal by photoelectrically converting incident light; an enlargement processing portion that extracts a partial range from a picture frame range of the imaging video signal obtained by the imaging portion and applies video enlargement processing; a first detection portion that obtains a detection value for an automatic processing capability of a first type using the picture frame range of the imaging video signal obtained by the imaging portion before enlargement as a subject; a second detection portion that obtains a detection value for an automatic processing capability of a second type using a picture frame range of the imaging video signal obtained by the imaging portion after enlargement by the enlargement processing portion as the subject; a control portion that controls operations of the automatic processing capabilities of the first and second types according to the detection values detected by the first and second detection portions; and one or plural processing portions that execute the automatic processing capabilities of the first and second types under control of the control portion.

The imaging apparatus may further include a third detection portion that obtains a detection value for an automatic processing capability of a third type using the imaging video signal obtained by the imaging portion after gamma processing in a picture frame range of the imaging video signal after enlargement by the enlargement processing portion as the subject. It may be configured in such a manner that the control portion controls an operation of the automatic processing capability of the third type according to the detection value detected by the third detection portion, and that at least one processing portion executes the automatic processing capability of the third type under the control of the control portion.

The second detection portion may be configured in such a manner so as to obtain the detection value using the picture frame range after enlargement by the enlargement processing portion as the subject by performing a detection operation upon input of the imaging video signal in the picture frame range after enlargement outputted from the enlargement processing portion.

Alternatively, the second detection portion may be configured in such a manner so as to obtain the detection value using the picture frame range after enlargement by the enlargement processing portion as the subject by performing a detection operation using a partial range of the imaging video signal in the picture frame range before enlargement inputted therein.

The automatic processing capability of the first type may include all or a part of a flare processing capability, a black balance processing capability, an auto black shading processing capability, and an auto white shading processing capability.

The automatic processing capability of the second type may include all or a part of an auto white balance processing capability, a dynamic contrast control processing capability, a low light alarm processing capability, an auto iris processing capability, and an auto hue processing capability.

The automatic processing capability of the third type may be an auto white balance processing capability.

According to another embodiment of the present invention, there is provided an imaging method including the steps of: obtaining a detection value for an automatic processing capability of a first type using a picture frame range of an imaging video signal obtained through photoelectric conversion of incident light before enlargement processing as a subject in a first detection step; obtaining a detection value for an automatic processing capability of a second type using a picture frame range of the imaging video signal after enlargement processing as the subject in a second detection step; obtaining a detection value for an automatic processing capability of a third type using the imaging video device after gamma processing in a picture frame range after enlargement processing as the subject in a third detection step; and executing the automatic processing capabilities of the first, second, and third types using the detection values detected in the first, second, and third detection steps, respectively.

According to the embodiments of the present invention, various automatic processing capabilities are classified into the first type, the second type, and further the third type and different subjects are used to detect the evaluation values for the respective types.

For the automatic processing capability of the first type, the evaluation value is detected using the picture frame range of the imaging video signal obtained by the imaging device, that is, the entire range of the captured image, as the subject.

For the automatic processing capability of the second type, the evaluation value is detected using the picture frame range after the enlargement processing in the picture frame range of the captured image signal obtained by the imaging device, that is, a partial image range extracted in the enlargement processing, as the subject.

For the automatic processing capability of the third type, the evaluation value is detected using a video signal after the gamma processing in the picture frame range after the enlargement processing within the picture frame range of the captured image signal obtained by the imaging device, as the subject.

Consequently, it becomes possible to perform an appropriate detection for a video signal to be outputted for the respective automatic processing capabilities.

According to the embodiments of the present invention, by performing appropriate detections corresponding to a video signal to be outputted for the respective automatic processing capabilities, the respective automatic processing capabilities are exerted effectively. It thus becomes possible to obtain a high-quality video signal even when the video signal to be outputted is an enlarged video signal.

For example, regardless of whether the enlargement processing is to be executed or not to be executed, it is possible to exert an operation capability effectively for each of the flare processing capability, the black balance processing capability, the auto black shading processing capability, the auto white shading processing capability, the steady auto white balance processing capability, the dynamic contrast control processing capability, the low light alarm processing capability, the auto iris processing capability, the auto hue processing capability, the start-up auto white balance processing capability, and so forth.

BRIEF DESCRIPTION OF THE DRAWINGS

FIG. 1 is a block diagram of an imaging apparatus according to an embodiment of the present invention;

FIG. 2A through FIG. 2C are views used to describe enlargement processing and ranges of the subject of detection according to an embodiment of the present invention;

FIG. 5 is a flowchart of the procedure of automatic processing according to an embodiment of the present invention;

FIG. 6 is a block diagram of an imaging apparatus according to an embodiment of the present invention.

DESCRIPTION OF THE PREFERRED EMBODIMENTS

Figure 3A:
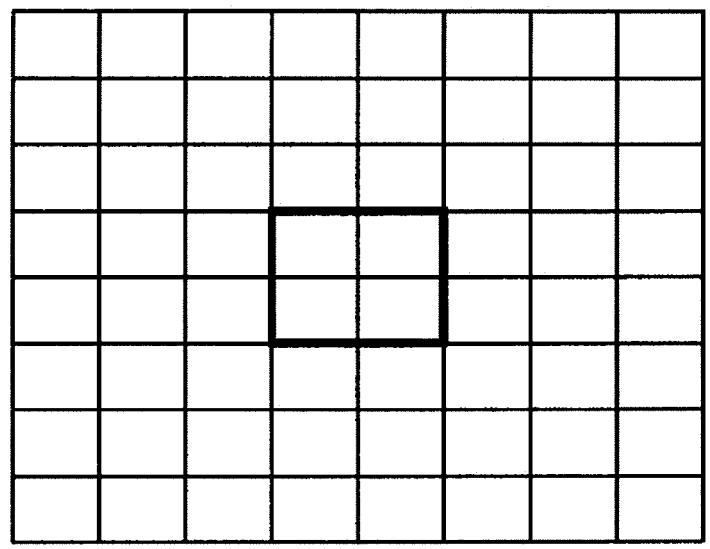
FIG. 3A and FIG. 3B are views used to describe a detection per pixel according to an embodiment of the present invention.

Hereinafter, an embodiment of the present invention will be described in the following order:

1. a first example of the configuration of the imaging apparatus;
2. an execution procedure of automatic processing capabilities;
3. a second example of the configuration of the imaging apparatus; and
4. a third example of the configuration of the imaging apparatus.

1. First Example of Configuration of Imaging Apparatus

FIG. 1 shows an example of the configuration of a major portion of an imaging device 1 according to an embodiment of the present invention.

The imaging apparatus 1 includes an imaging optical system 2, an imaging device portion 3, an analog video processing portion 4, an A/D conversion portion 5, a lens drive portion 6, a timing generator 7, a DSP (Digital Signal Processor) 10, and a controller 30.

Incident light from a subject is photoelectrically converted by the imaging optical system 2 and the imaging device portion 3 and an imaging video signal is obtained.

The imaging optical system 2 has a plurality of optical lens groups, such as a focus lens and a zoom lens, and an aperture mechanism that regulates an amount of incident light by opening and closing operations.

The lens drive portion 6 has a transportation mechanism that transports the focus lens and the zoom lens in the imaging optical system 2 in the optical axis direction and a drive mechanism of the aperture mechanism. The lens drive portion 6 transports the lenses and drives the aperture mechanism under the control of the controller 30. Consequently, focus control, a zooming operation, and further an exposure adjustment are executed.

A light flux from the subject passes through the imaging optical system 2 and an image of the subject is formed on the imaging device portion 3.

The imaging device portion 3 photoelectrically converts the image of the subject thus formed and outputs an imaging video signal corresponding to the image of the subject.

The imaging device portion 3 has a rectangular imaging region made up of a plurality of pixels and outputs video signals, which are analog signals corresponding to charges accumulated in the respective pixels, to the analog video processing portion 4 successively per pixel. As the imaging device portion 3, for example, a CCD (Charge Coupled Device) sensor array or a CMOS (Complementary Metal Oxide Semiconductor) sensor array is used.

The analog video processing portion 4 has a CDS (Correlated Double Sampling) circuit and an AGC (Auto Gain control) circuit inside, and applies predetermined analog processing to a video signal inputted therein from the imaging device portion 3.

Auto black balance (ABB) processing and auto black shading (ABS) processing are also executed in the analog video processing portion 4.

The A/D conversion portion 5 converts an analog video signal processed in the analog video processing portion 4 to a digital video signal and supplies the converted signal to the DSP 10.

The timing generator 7 is controlled by the controller 30 and controls the timings of respective operations of the imaging device portion 3, the analog video processing portion 4, and the A/D conversion portion 5.

More specifically, in order to control the imaging operation timing of the imaging device portion 3, the timing generator 7 supplies the imaging device portion 3 with a timing signal for exposure and charge reading, a timing signal as an electronic shutter capability, a transfer clock, a synchronizing signal corresponding to a frame rate, and so forth. The timing generator 7 supplies the respective timing signals also to the analog video processing portion 4, so that processing is executed in the analog video processing portion 4 in synchronization with the transfer of a video signal from the imaging device portion 3.

By controlling the various timing signals generated in the timing generator 7, the controller 30 becomes able to set the frame rate of a captured image and control the electronic shutter (variable control of exposure time within a frame).

The DSP 10 applies various types of digital signal processing to an imaging video signal inputted therein from the A/D conversion portion 5.

In the DSP 10, for example, as is shown in the drawing, processing capabilities, such as a digital video processing portion 11, an enlargement circuit 12, a gamma and knee circuit 13, detection portions 14, 15, and 16, and area setting portions 17, 18 and 19 are achieved by internal hardware and software.

The digital video processing portion 11 applies processing to an imaging video signal inputted therein. For example, it makes a white correction as steady auto white balance (ATW) processing and start-up auto white balance (AWB) processing. Also, it makes a white shading correction as auto white shading (AWS) processing. Further, it makes a flare correction as flare (FLARE) processing.

The enlargement circuit 12 applies video enlargement processing. It executes processing to enlarge a video, for example, by two-fold under the control of the controller 30.

FIG. 2A through FIG. 2C schematically show the enlargement processing. A picture frame A1 of FIG. 2A shows a range of all the pixels obtained through photoelectric conversion in the imaging device portion 3.

By contrast, the enlargement circuit 12 extracts, for example, a pixel region as an enlargement range A3 of FIG. 2B to form an enlarged image by pixel interpolation or the like and thereby generates, as is shown in FIG. 2C, an enlarged video signal same as the original picture frame A1, that is, an enlarged image signal having an image content of the enlargement range A3.

It should be appreciated that the enlargement circuit 12 outputs an imaging video signal intact without executing the enlargement processing particularly when there is no enlargement command from the controller 30 (or when the same size is specified as the scale of enlargement).

The gamma and knee circuit 13 applies gamma correction processing, knee correction processing, and dynamic contrast control (DCC) processing to an imaging video signal.

An output of the gamma and knee circuit 13 is supplied to another unillustrated circuit system as an imaging vide signal. For example, the output is supplied to a display portion and displayed and monitored thereon or the output is supplied to a recording portion and recorded in the form of a moving image or a still image. Further, the output is supplied to an external interface portion and transferred and outputted to an external device.

Each of the detection portions 14, 15, and 16 receives an input of an imaging video signal and detects evaluation values for the respective processing capabilities.

The detection portion 14 receives an input of an imaging video signal in a stage where it is outputted from the digital video processing portion 11, that is, before it is processed in the enlargement circuit 12. The detection portion 14 uses this imaging video signal as a subject and detects evaluation values from signals of the respective pixels, for example, in an effective detection area A2 of FIG. 2A.

The detection portion 14 detects evaluation values for the FLARE processing, the ABB processing, the ABS processing, and the AWS processing. Hereinafter, the evaluation values detected by the detection portion 14 for these processing operations are referred to as the FLARE detection value, the ABB detection value, the ABS detection value, and the AWS detection value.

The detection portion 15 receives an input of an imaging video signal in an output stage of the enlargement circuit 12. The detection circuit 15 uses an imaging video signal, which is an output of the enlargement circuit 12, as a subject and detects evaluation values from signals of the respective pixels in the effective detection area. In this case, the effective detection area is the effective detection area A2 of FIG. 2A when the enlargement circuit 12 has not executed the enlargement processing. On the contrary, in a case where the enlargement circuit 12 has executed the enlargement processing, evaluation values are detected from signals of the respective pixels, for example, in an effective detection area A4 of FIG. 2B.

The detection portion 15 detects evaluation values for the ATW processing, the DCC processing, low light (Low_LIGHT) processing, auto iris (AUTO_IRIS) processing, and auto hue (AUTO_HUE) processing. Hereinafter, the evaluation values detected by the detection portion 15 for these processing operations are referred to as the ATW detection value, the DCC detection value, the LOW_LIGHT detection value, the AUTO_IRIS detection value, and the AUTO_HUE detection value.

The detection portion 16 receives an input of an imaging video signal in an output stage of the gamma and knee circuit 13. The detection portion 16 performs a detection operation using an imaging video signal, which is an output of the gamma and knee circuit 13, as the subject. In this case, too, in a case where the enlargement circuit 12 has not executed the enlargement processing, the effective detection area is the effective detection area A2 of FIG. 2A. On the contrary, in a case where the enlargement circuit 12 has executed the enlargement processing, the evaluation values are detected from signals of the respective pixels, for example, in the effective detection area A4 of FIG. 2B. The detection circuit portion 16 detects an evaluation value for the AWB processing. Hereinafter, the evaluation value detected by the detection portion 16 is referred to as the AWB detection value.

Each of the area setting portions 17, 18, and 19 sets the effective detection area for an imaging video signal inputted therein. For example, the area setting portion 17 sets the effective detection area A2 to have a longer side ratio of 80% and a shorter side ratio of 80% with respect to the original picture frame A1. The area setting portions 18 and 19 operate in the same manner. For example, each sets an effective detection area having a longer side ratio of 80% and a shorter side ratio of 80% for an imaging video signal inputted therein.

In a case where the effective detection area A2 is set, for example, to have a longer side ratio of 80% and a shorter side ratio of 80%, an area ratio with respect to the original picture frame A1 is 64%.

Under the circumstance of FIG. 2B, in a case where the enlargement range A3 has one half the longer side and one half the shorter side of the original picture frame A1 (that is, in the case of a two-fold enlarged image), the effective detection area A2 (=range A4) of FIG. 2C is a region accounting for 16% of an area of the original picture frame A1 before enlargement shown in FIG. 2A.

Figure 3B:
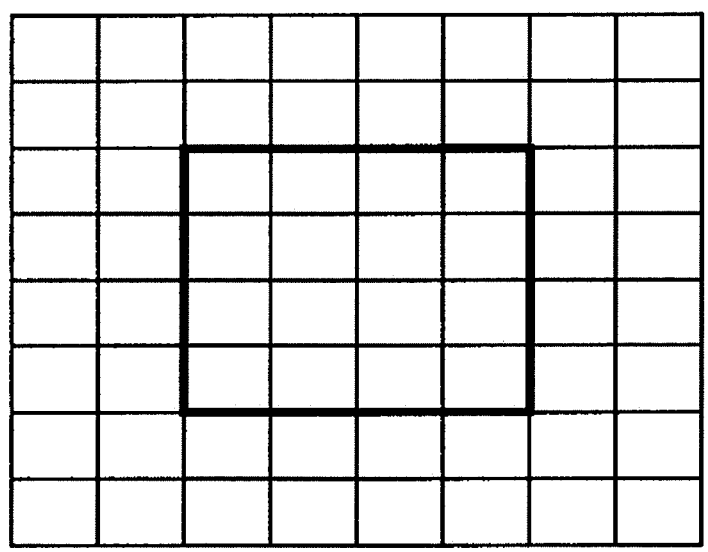

When operations of the detection portions 14, 15, and 16 are viewed per pixel, for example, in a case where the original picture frame A1 is used as the subject, a technique of detecting a luminance value found by the four-pixel average as is shown in FIG. 3A is adopted in some cases. When an enlarged image is considered in a case where this technique is adopted, the four pixels become a range of 16 pixels shown in FIG. 3B. In this case, the luminance value may be detected pixel by pixel by cancelling the four-pixel average.

The controller 30 achieves the respective control capabilities shown in FIG. 1 by software processing.

An enlargement control portion 41 controls the enlargement processing for the enlargement circuit 12 in the DSP 10 according to an enlargement command signal Dex, for example, by an operation of the user or the software program.

Assume that the enlargement command signal Dex is a signal specifying, for example, whether the enlargement is to be executed or not to be executed, then the enlargement control portion 41 specifies, for example, two-fold enlargement processing to the enlargement circuit 12 when the command specifies the enlargement to be executed. On the contrary, when the command specifies the enlargement not to be executed, the enlargement control portion 41 specifies the enlargement circuit 12, for example, not to execute the enlargement processing.

Also, assume that the enlargement command signal Dex is a signal specifying the scale of enlargement, then the enlargement control portion 41 controls the enlargement circuit 12 to execute the enlargement processing at the scale specified by the enlargement specification signal Dex.

Figure 4D:
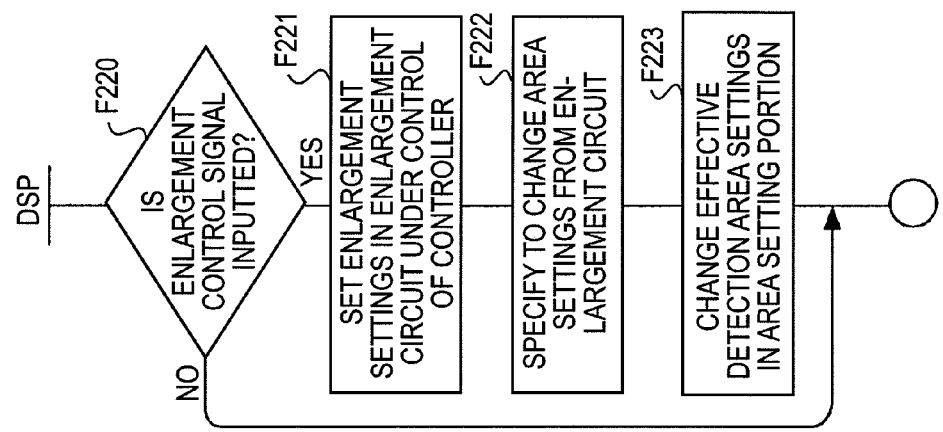
FIG. 4A through FIG. 4D are flowcharts of the control when switching the enlargement processing according to an embodiment of the present invention.
Figure 4C:
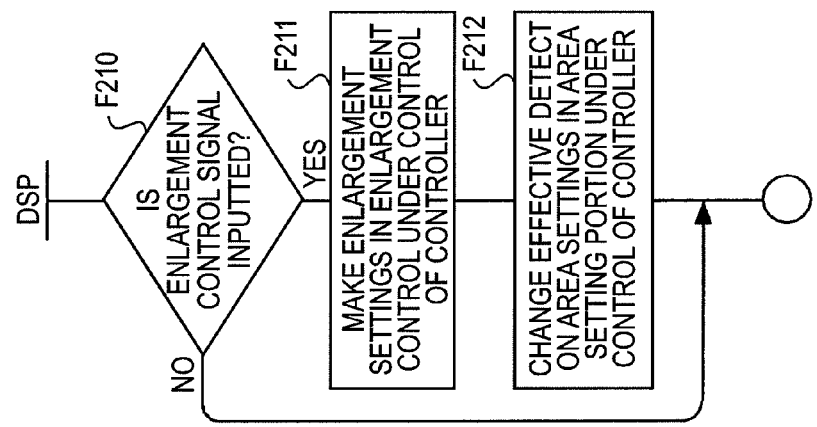
Figure 4B:
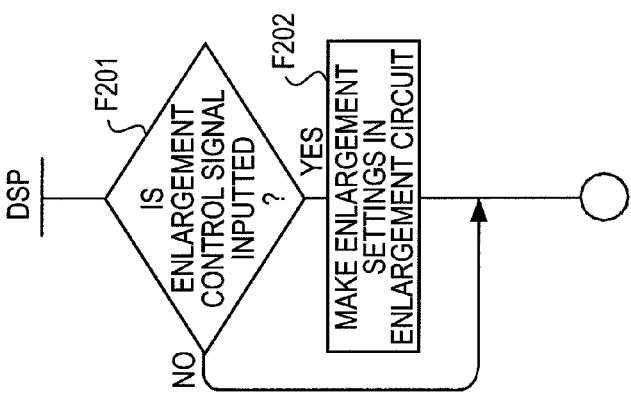
Figure 4A:
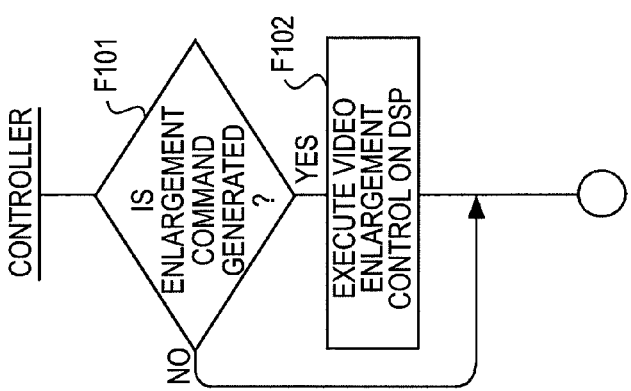

FIG. 4A and FIG. 4B show the processing of the enlargement control portion 41 in the controller 30 and the processing at the end of the DSP 10.

When the enlargement command signal Dex is generated in Step F101 of FIG. 4A, the enlargement control portion 41 executes video enlargement control on the enlargement circuit 12 in the DSP 10 according to the enlargement command signal Dex in Step F102.

At the end of the DSP 10, as is shown in FIG. 4B, upon input of the control signal from the enlargement control portion 41 in Step F201, the enlargement settings are made in the enlargement circuit 12 in Step F202.

Consequently, an imaging video signal inputted into the enlargement circuit 12 thereafter is subjected to the enlargement processing while the settings are made as described above.

An auto iris control portion 31 controls an auto exposure adjustment operation using a gain control portion 31a, a shutter control portion 31b, and a light amount control portion 31c.

The AUTO_IRIS detection value from the detection portion 15 is supplied to the auto iris control portion 31. According to the AUTO_IRIS detection value, the gain control portion 31a, the shutter control portion 31b, and the light amount control portion 31c calculate respective exposure adjustment values.

The gain control portion 31a controls a gain provided to an imaging video signal by supplying the analog video processing portion 4 with a gain value as the exposure adjustment value.

The shutter control portion 31b adjusts a shutter speed (exposure time within the frame period) by supplying the timing generator 7 with an electronic shutter control value as the exposure adjustment value.

The light amount control portion 31c controls the aperture mechanism to execute an incident light amount adjustment by supplying the lens drive portion 6 with an aperture drive signal as the exposure adjustment value.

A steady white correction control portion 32 and a start-up white correction control portion 33 execute white balance adjustment control.

The ATW detection value from the detection portion 15 is supplied to the steady white correction control portion 32. The steady white correction referred to herein means a steady automatic tracking correction capability for white. The steady white correction control portion 32 constantly calculates a white balance correction value in response to the ATW detection value and supplies the digital video processing portion 11 with the white balance correction value for a white balance correction to be made.

The AWB detection value from the detection portion 16 is supplied to the start-up white correction control portion 33. The start-up white correction referred to herein means a capability of making a white balance correction in a non-steady manner at the start-up or upon request from the user. When the necessity arises, the start-up white correction control portion 33 calculates a white balance correction value in response to the AWB detection value and supplies the digital video processing portion 11 with the white balance correction value for a white balance correction to be made.

A flare control portion 34 executes flare correction control. The flare control portion 34 calculates a flare correction value on the basis of the FLARE detection value supplied from the detection portion 14. The flare control portion 34 then supplies the digital video processing portion 11 with the flare correction value for a flare correction to be made.

A black control portion 35 executes auto black balance adjustment control. The black control portion 35 calculates a black balance correction value on the basis of the ABB detection value supplied from the detection portion 14. The black control portion 35 then supplies the analog video processing portion 4 with the black balance correction value for a black balance correction to be made.

A black shading correction portion 36 executes auto black shading adjustment control. The black shading control portion 36 calculates a black shading correction value on the basis of the ABS detection value supplied from the detection portion 14. The black shading control portion 36 then supplies the analog video processing portion 4 with the black shading correction value for a black shading correction to be made.

A white shading control portion 37 executes auto white shading adjustment control. The white shading control portion 37 calculates a white shading correction value on the basis of the AWS detection value supplied from the detection portion 14. The white shading control portion 37 then supplies the digital video processing portion 11 with the white shading correction value for a white shading correction to be made.

A knee control portion 38 controls a knee correction operation. The DCC detection value is supplied to the knee control portion 38 from the detection portion 15. The knee control portion 38 calculates a knee correction value on the basis of the DCC detection value and supplies the gamma and knee circuit 13 with the knee correction value for the knee correction processing to be executed.

A color detection and zebra output portion 34 executes auto hue processing control. The AUTO_HUE detection value is supplied to the color detection and zebra output portion 34 from the detection portion 15, so that a detail is appended to a particular color or a target color for a color adjustment is detected. The color detection and zebra output portion 34 also outputs a zebra signal.

A message control portion 40 executes alarm output control in a low luminance state. The LOW_LIGHT detection value is supplied to the message control portion 40 from the detection portion 15. The message control portion 40 thus determines whether the luminance across the entire screen has reached a certain level. When the determination result indicates insufficiency of the luminance level, the message control portion 40 executes alarm message output control.

2. Execution Procedure of Automatic Processing Capabilities

The execution procedure of various types of automatic processing, for example, in the imaging apparatus 1 configured as above will now be described.

As has been described, the detection portions 14, 15, and 16 are provided as detection portions that obtain detection values as luminance information and color information for the automatic processing.

Herein, assume that the detection portion 14 performs a detection corresponding to automatic processing capabilities of a first type, the detection portion 15 performs a detection according to automatic processing capabilities of a second type, and the detection portion 16 performs a detection corresponding to automatic processing capabilities of a third type.

Herein, automatic processing capabilities of the first type are the flare processing capability, the black balance processing capability, the auto black shading processing capability, and the auto white shading processing capability. The evaluation values for these automatic processing capabilities are detected by the detection portion 14.

Automatic processing capabilities of the second type are the steady auto white balance processing capability, the dynamic contrast control processing capability, the low light alarm processing capability, the auto iris processing capability, and the auto hue processing capability. The evaluation values for these automatic processing capabilities are detected by the detection portion 15.

An automatic processing capability of the third type is the start-up auto white balance processing capability. The evaluation value for this automatic processing capability is detected by the detection portion 16.

The control on the automatic processing capabilities is executed according to the flow shown in FIG. 5.

In Step ST1, an imaging video signal is obtained by the processing in the imaging device portion 3, the analog video processing portion 4, and the A/D conversion portion 5. The imaging video signal is inputted into the DSP 10.

In Steps ST2, ST3, and ST4, the detection portions 14, 15, and 16 detect the evaluation values for the automatic processing capabilities of the first, second, and third types, respectively.

In Step ST5, the detection values from the respective detection portions 14, 15, and 16 are supplied to the corresponding control functional portions in the controller 30 in the manner described above.

In Step ST6, the respective control functional portions in the controller 30 calculate the correction values on the basis of the detection values in the manner described above. Accordingly, the lens drive portion 6, the timing generator 7, the analog video signal processing portion 4, the digital video processing portion 11, the gamma and knee circuit 13, the message output, and so forth are controlled. The respective automatic processing capabilities are thus executed.

Herein, by the processing in Steps ST2, ST3, and ST4, that is, by detecting the evaluation values using an imaging video signal in different processing stages by the detection portions 14, 15, and 16, the respective automatic processing capabilities are executed appropriately.

Each of the automatic processing capabilities will now be described.

Flare Processing Capability (First Type)

As the FLARE detection value used to correct the flare, the luminances of respective colors of RGB are obtained by the detection portion 14. It is appropriate for the flare processing to use the detection values before the signal undergoes the respective image quality processes in the DSP 10.

Because the flare has influences on the entire area of the CCD or the like used as the imaging device portion 3, it is necessary to constantly make a correction in the area of the picture frame range A1 of an imaging video signal independently of whether a video is enlarged or not. For this reason, the FLARE detection value is obtained by the detection portion 14.

Black Balance Processing Capability (First Type)

In order to correct black, values of R-G and B-G are obtained as the ABB detection value. In this case, too, because it is necessary to constantly make a correction in the picture frame range A1, which is the entire imaging range, the ABB detection value is obtained by the detection portion 14.

Auto Black Shading Processing Capability (First Type)

In order to correct black shading, the values of respective R, G, and B are obtained as the ABS detection value. In this case, too, because it is necessary to constantly make a correction in the picture frame range A1, which is the entire imaging range, the ABS detection value is obtained by the detection portion 14.

Auto White Shading Processing Capability (First Type)

In order to correct white shading, the values of respective R, G, and B are obtained as the AWS detection value. In this case, too, because it is necessary to constantly make a correction in the picture frame range A1, which is the entire imaging range, the AWS detection value is obtained by the detection portion 14.

It should be appreciated, however, that this capability is operated only at the time of maintenance. Accordingly, no particular action may be taken for this capability during a normal operation including the enlargement.

Steady Auto White Balance Processing Capability (Second Type)

This capability is an automatic tracking and automatic processing capability for white that is operated in a steady state. For this capability, values of R-G and B-G are obtained as the ATW detection value.

It is appropriate to use the detection value before the signal undergoes the various image quality processes in the DSP 10. Also, in the case of two-fold enlargement using the enlargement circuit 12, it is appropriate to perform a detection using, for example, the enlargement range A3 of FIG. 2B as the subject. When the picture frame range A1 is used as the subject, a correction is made by detecting a color on the outside of the enlarged video, which raises an inconvenience that the enlarged image is not formed in appropriate white.

To avoid such an inconvenience, the ATW detection value is obtained by the detection portion 15 using an imaging video signal after the enlargement processing as the subject.

Dynamic Contrast Control Processing Capability (Second Type)

In order to perform the automatic contrast correction control chiefly to ensure the gradation in a high luminance portion, the peak value of luminance is obtained as the DCC detection value.

In the case of two-fold enlargement using the enlargement circuit 12, it is appropriate to perform a detection using the enlargement range A3 of FIG. 2B as the subject. When the picture frame range A1 is used as the subject, a correction may be made by detecting the peak luminance on the outside of the enlarged video and appropriate gradation in the high luminance portion may not be obtained.

To avoid such an inconvenience, the DCC detection value is obtained by the detection portion 15 using an imaging video signal after the enlargement processing and before the gamma correction as the subject.

Low Light Alarm Processing Capability (Second Type)

This capability is an alarm capability when the luminance of the entire screen fails to reach a certain level. The luminance average value of the entire screen is obtained as the LOW_LIGHT detection value.

In the case of two-fold enlargement using the enlargement circuit 12, it is appropriate to perform a detection using the enlargement range A3 of FIG. 2B as the subject. When the picture frame range A1 is used as the subject, the luminance average value including the outside of the enlarged video is detected. For example, even in a case where the luminance of the enlarged image maintains luminance at a certain level, a low light alarm is given when the luminance on the outside is low.

To avoid such an inconvenience, the LOW_LIGHT detection value is obtained by the detection portion 15 using an imaging video signal after the enlargement processing as the subject.

Auto Iris Processing Capability (Second Type)

This capability is to control corrections in achieving appropriate exposure using the aperture mechanism, the electronic shutter, and the gain adjustment. Accordingly, the luminance average value and the peak value across the entire screen are obtained as the AUTO_IRIS detection value.

In this case, it is appropriate to use a detection value before the signal passes through the image quality process circuits, such as the gamma and knee circuit 13 in the DSP 10. Also, in the case of two-fold enlargement using the enlargement circuit 12, it is appropriate to perform a detection using the enlargement range A3 of FIG. 2B as the subject. When the picture frame range A1 is used as the subject, the luminance average value and the peak value including the outside of the enlarged video are detected. For example, in a case where the luminance average on the outside of the enlarged image is low, the AUTO_IRIS detection value shifts to a direction indicating an insufficient light amount, which makes the enlarged video lighter more than necessary.

To avoid such an inconvenience, the AUTO_IRIS detection value is obtained by the detection portion 15 using an imaging video signal before the gamma correction and after the enlargement processing as the subject.

Auto Hue Processing Capability (Second Type)

This capability is to append a detail to a particular color or to detect a target color for color adjustment. In this case, the respective luminance values of R, G, and B are obtained as the AUTO_HUE detection value.

It is appropriate to use a detection value before the signal passes through image quality process circuits, such as the gamma and knee circuit 13 in the DSP 10. In the case of two-fold enlargement using the enlargement circuit 12, it is appropriate to perform a detection using the enlargement range A3 of FIG. 2B as the subject. When the picture frame range A1 is used as the subject, a detection is performed over an area larger than the color detection area when the image is not enlarged. It is desirable that the area for color detection has a constant area independently of whether an image is enlarged or not. For this reason, the AUTO_HUE detection value is obtained by the detection portion 15 using an imaging video signal before the gamma correction and after the enlargement processing.

Start-up Auto White Balance Processing Capability (Third Type)

This capability is to correct white. This correction, however, is not a white correction made in a steady state.

In order to make a correction so that white is obtained even in a state after the gamma correction, the AWB detection value is obtained by the detection portion 16 using an imaging video signal having passed through the gamma and knee circuit 13 as the subject.

As has been described, it is appropriate for each of the automatic processing capabilities to detect the evaluation value in an appropriate stage corresponding to the content of the processing capability.

Herein, as has been described above, the evaluation values are detected for the respective automatic processing capabilities of the first, second, and third types by the detection portions 14, 15, and 16, respectively. Consequently, the respective automatic processing capabilities are exerted appropriately.

Hence, each capability is exerted in an appropriate manner independently of whether the enlargement processing is to be executed or not to be executed. It thus becomes possible to output a high-quality imaging video signal.

It is understood from the description of the respective capabilities, those classified into the first type are automatic processing capabilities for which it is appropriate to detect the evaluation values using the picture frame range obtained by the imaging device portion 3 as the subject. Those classified into the second type are automatic processing capabilities for which it is appropriate to detect the evaluation values using the picture frame range of the enlarged portion as the subject in a case where an imaging video signal is enlarged and displayed or outputted later. Further, the capability classified into the third type is the automatic processing capability for which it is appropriate to detect the evaluation value using an imaging video signal after the gamma correction as the subject.

3. Second Example of Configuration of Imaging Apparatus

FIG. 6 shows a second example of the configuration of the imaging apparatus 1. Like components are labeled with like reference numerals with respect to FIG. 1 and descriptions of such components are omitted herein.

The example of FIG. 6 is different from the counterpart of FIG. 1 in that both the detection portions 14 and 15 receive an input of an imaging video signal in a stage preceding the enlargement circuit 12.

Also, the enlargement control portion 41 in the controller 30 also controls the area setting portion 18.

The detection portion 14 is of the same configuration as the counterpart of FIG. 1. For the detection portion 15 for the automatic processing capabilities of the second type, it is appropriate to obtain the detection values using the picture frame range after enlargement by the enlargement circuit 12 as the subject. Accordingly, the area setting portion 18 is configured to switch the subjects of detection by the detection portion 15 under the control of the enlargement control portion 41.

FIG. 4A and FIG. 4C are processing examples in this case.

The enlargement command signal Dex is generated in Step F101 of FIG. 4A and the enlargement control portion 41 then executes the video enlargement control on the DSP 10 according to the enlargement command signal Dex in Step F102.

At the end of the DSP 10, as is shown in FIG. 4C, upon input of the control signal from the enlargement control portion 41 in Step F210, the enlargement settings are made in the enlargement circuit 12 in Step F211. Further, in Step F212, the area setting portion 18 changes the settings of the range defined as the subject of detection by the detection portion 15. For example, in a case where the enlargement processing is not executed, the settings are changed so that the detection processing currently executed by the detection portion 15 using the picture frame range A1 (effective detection area A2) of FIG. 2A as the subject will be executed using the enlargement range A3 (effective detection area A4) of FIG. 2B as the subject.

Consequently, an imaging video signal inputted into the enlargement circuit 12 thereafter is subjected to the enlargement processing while the settings are made as above, which enables the detection portion 15 to obtain the detection values using the picture frame range after enlargement as the subject.

Hence, as with the case of the first example of the configuration shown in FIG. 1, the effects by the respective automatic processing capabilities are exerted appropriately.

4. Third Example of Configuration of Imaging Apparatus

Figure 7:
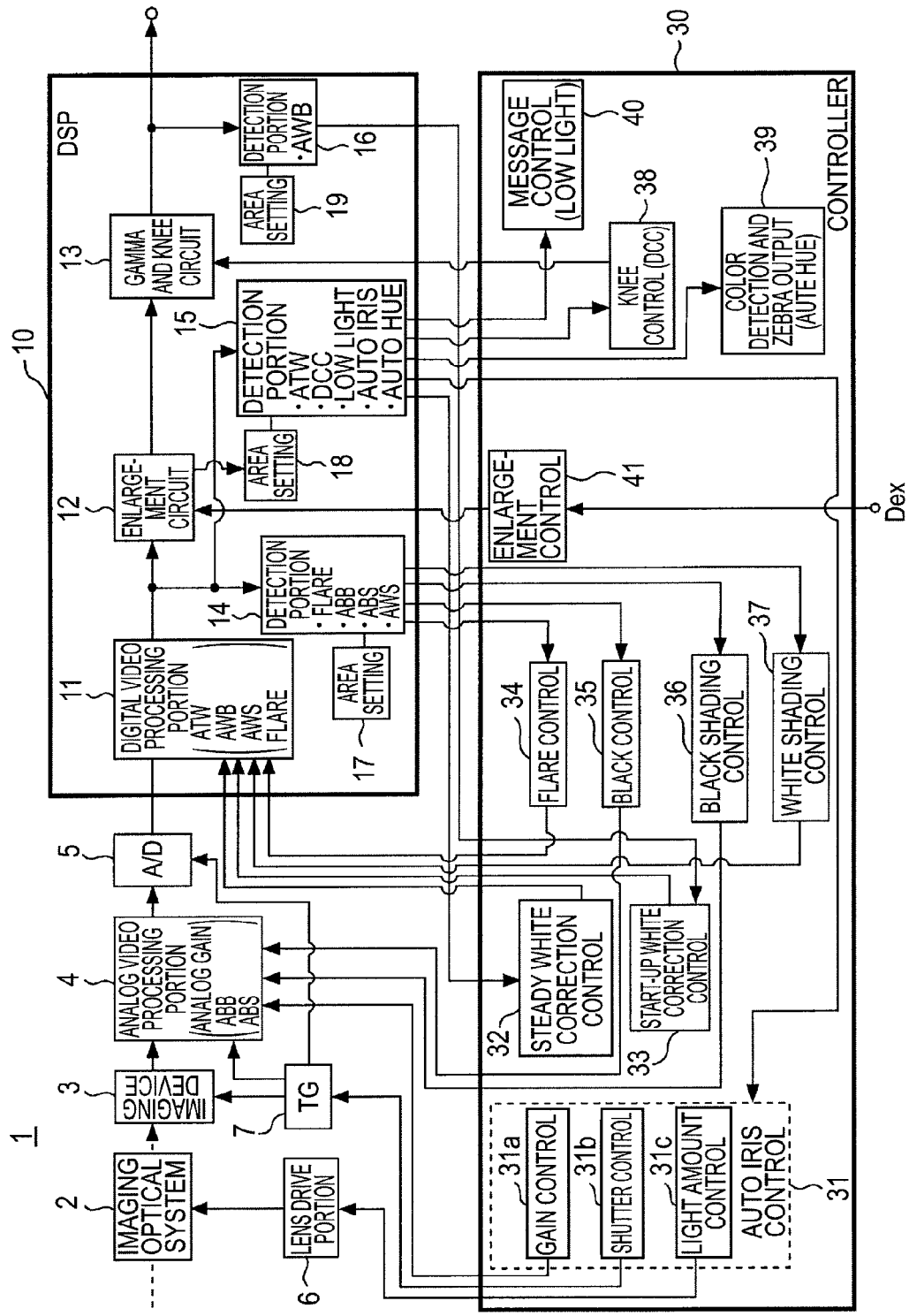
FIG. 7 is a block diagram of an imaging apparatus according to an embodiment of the present invention.

FIG. 7 shows a third example of the configuration of the imaging apparatus 1. Like components are labeled with like reference numerals with respect to FIG. 1 and descriptions of such components are omitted herein.

The example of FIG. 7 is the same as the counterpart of FIG. 6 in that both the detection portions 14 and 15 receive an input of an imaging video signal in a stage preceding the enlargement circuit 12. However, it is configured in such a manner that the enlargement circuit 12 also controls the area setting portion 18 according to the enlargement settings.

In short, this is an example where the ranges of the subject for the detection portion 15 are switched inside the DSP 10.

FIG. 4A and FIG. 4D are examples of the processing in this case.

The enlargement command signal Dex is generated in Step F101 of FIG. 4A, and the enlargement control portion 41 then executes the video enlargement control on the DSP 10 according to the enlargement command signal Dex in Step F102.

At the end of the DSP 10, as is shown in FIG. 4D, upon input of the control signal from the enlargement control portion 41 in Step F220, the enlargement settings are made in the enlargement circuit 12 in Step F221. Further, in Step F222, the enlargement circuit 12 issues a command to the area setting portion 18 according to the enlargement settings. In Step F223, the area setting portion 18 changes the settings of the range of the subject of detection by the detection portion 15. For example, in a case where the enlargement processing is not to be executed, the settings are changed so that the detection processing currently executed by the detection portion 15 using the picture frame range A1 (effective detection area A2) of FIG. 2A as the subject will be executed using the enlargement range A3 (effective detection area A4) of FIG. 2B as the subject.

Consequently, an imaging video signal inputted into the enlargement circuit 12 thereafter is subjected to the enlargement processing while the settings are made as described above, which enables the detection portion 15 to obtain the detection values using the picture frame range after enlargement as the subject.

Hence, as with the case of the examples of the configuration shown in FIG. 1 and FIG. 6, the effects by the respective automatic processing capabilities are exerted appropriately.

While the embodiments of the present invention has been described, it should be appreciated that the present invention is not limited to the embodiment described above and can be modified in various manners. For example, besides the automatic processing capabilities of the types specified above, there may be automatic processing capabilities of another type and the evaluation values may be detected in an appropriate video signal stage according to these capabilities.

The present application contains subject matter related to that disclosed in Japanese Priority Patent Application JP 2008-275265 filed in the Japan Patent Office on Oct. 27, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imaging portion that obtains an imaging video signal by photoelectrically converting incident light on a plurality of pixels;
    an enlargement processing portion sets a pixel detection area from a first pixel frame range of the imaging video signal obtained by the imaging portion and applies video enlargement processing to the pixel detection area;
    a first detection portion obtains detection values of the pixels, for an automatic processing capability of a first type, using the first pixel frame range of the imaging video signal obtained by the imaging portion before enlargement as a subject;
    area setting portion sets an effective detection area of the pixel detection area based on a signal from the enlargement processing portion;
    a second detection portion obtains detection values of the pixels, for an automatic processing capability of a second type different from the first type, using the effective detection area set by the area setting portion which is determined after enlargement by the enlargement processing portion as the subject;
    a control portion that calculates corrections to the automatic processing capabilities of the first and second types according to the detection values of the pixels detected by the first and second detection portions; and
    one or plural processing portions that execute the automatic processing capabilities of the first and second types under control of the control portion.

2. The imaging apparatus according to claim 1 further comprising:
    a third detection portion that obtains a detection value of the pixels, for an automatic processing capability of a third type, using the imaging video signal obtained by the imaging portion after gamma processing in the pixel detection area of the imaging video signal after enlargement by the enlargement processing portion as the subject, wherein the control portion calculates corrections to the automatic processing capability of the third type according to the detection value of the pixels detected by the third detection portion, and at least one processing portion executes the automatic processing capability of the third type under the control of the control portion.

3. The imaging apparatus according to claim 2,
wherein the second detection portion is configured in such a manner so as to obtain the detection values of the pixels using the pixel detection area after enlargement by the enlargement processing portion as the subject by performing a detection operation upon input of the imaging video signal in the pixel detection area after enlargement outputted from the enlargement processing portion.

4. The imaging apparatus according to claim 2,
wherein the second detection portion is configured in such a manner so as to obtain the detection values of the pixels using the pixel detection area after enlargement by the enlargement processing portion as the subject by performing a detection operation using a partial pixel range of the imaging video signal in the first pixel frame range before enlargement inputted therein.

5. The imaging apparatus according to claim 2,
wherein the automatic processing capability of the first type includes all or a part of a flare processing capability, a black balance processing capability, an auto black shading processing capability, and an auto white shading processing capability.

6. The imaging apparatus according to claim 2,
wherein the automatic processing capability of the second type includes all or a part of an auto white balance processing capability, a dynamic contrast control processing capability, a low light alarm processing capability, an auto iris processing capability, and an auto hue processing capability.

7. The imaging apparatus according to claim 2,
wherein the automatic processing capability of the third type is an auto white balance processing capability.

8. An imaging method for an imaging apparatus including at least an imaging portion, an enlargement portion, an area setting portion, a first detection portion, a second detection portion, the imaging method comprising the steps of:

setting a pixel detection area from a first pixel frame range of an imaging video signal obtained by the imaging portion based on the enlargement portion;

setting an effective detection area of the pixel detection area based on an output from the enlargement portion;

obtaining detection values of the pixels, for an automatic processing capability of a first type, using the first picture frame range of the imaging video signal obtained through photoelectric conversion of incident light on a plurality of pixels before enlargement processing as a subject;

obtaining detection values of the pixels, for an automatic processing capability of a second type different from the first type, using the effective detection area which is determined after enlargement processing as the subject;

obtaining a detection value of the pixels, for an automatic processing capability of a third type, using the imaging video device after gamma processing in the effective detection area which is determined after enlargement processing as the subject;

calculating corrections to the automatic capabilities of the first, second and third types using the detection values of the pixels detected in the respective obtaining steps; and executing the automatic processing capabilities of the first, second, and third types based upon the corrections.

* * * * *